B. M. MATHIAS.
TURNBUCKLE LOCK.
APPLICATION FILED JUNE 20, 1917.
1,286,701. Patented Dec. 3, 1918.
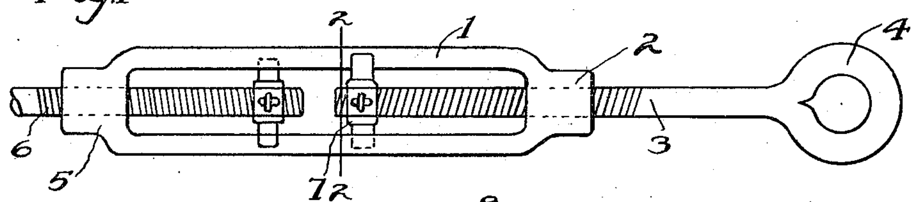
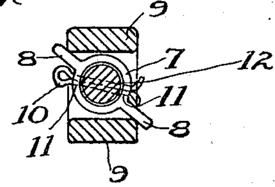
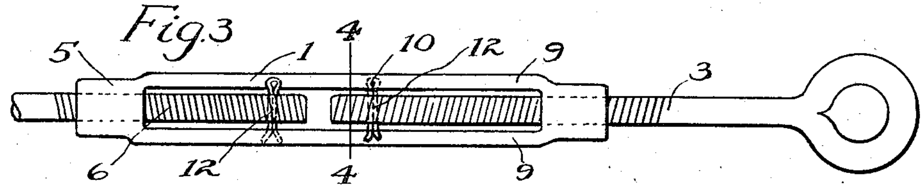
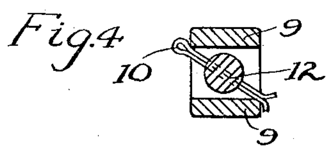
Inventor:
Berton M. Mathias
by C. D. Enochs
Attorney
THE NORRIS PETERS CO., PHOTO-LITHO., WASHINGTON, D. C.

UNITED STATES PATENT OFFICE.

BERTON M. MATHIAS, OF MINNEAPOLIS, MINNESOTA.

TURNBUCKLE-LOCK.

1,286,701. Specification of Letters Patent. Patented Dec. 3, 1918.

Application filed June 20, 1917. Serial No. 178,864.

*To all whom it may concern:*

Be it known that I, BERTON M. MATHIAS, a citizen of the United States, and a resident of Minneapolis, in the county of Hennepin and State of Minnesota, have invented certain new and useful Improvements in Turnbuckle-Locks, of which the following is a specification.

One object of my invention is to provide in a turnbuckle having a body and a bolt, means for locking the two parts in any desired position.

Another object of my invention is to provide in a turnbuckle having a body and a bolt, a strong locking collar having wings thereon, and means for connecting the collar to the bolt.

With these and incidental objects in veiw the invention consists of certain novel features of construction and combination of parts, the essential elements of which are hereinafter described with reference to the drawing which accompanies and forms a part of this specification.

In the drawing Figure 1 is a side elevation of the preferred construction of my improved turnbuckle; Fig. 2 is a section taken on the line 2—2, Fig. 1; Fig. 3 is a view similar to that shown in Fig. 1 taken of a modification of my improved turnbuckle; and Fig. 4 is a section taken on the line 4—4, Fig. 3.

In my preferred construction the body 1 of the turnbuckle engages at 2 by screw connection with the bolt 3 which preferably has an eye 4 formed in one end thereof.

The other end of the body 1 engages at 5 with a second bolt 6 by a reverse screw connection, so that the turning of the body will tend to draw both bolts into the body or force both bolts outwardly from the body.

A collar 7 is provided for the bolt 3 having wings 8 projecting therefrom as better shown in Fig. 2.

The wings are of such length that they project beyond the side members 9 of the body 1, and the collar closely fits the bolt 3 without screw connection.

A cotter pin 10 is passed through apertures 11 in the collar 7 and the aperture 12 in the bolt 6, locking the collar to the bolt, and the wings 8 prevent the rotation of the bolt in the body 1.

In the alternate construction shown in Fig. 3, the bolt 3 has the aperture 12 therein, and a cotter pin 10 passes through this aperture, but the body 1 is formed so that the side members 9 lie close to the bolt 3 so the cotter pin 10 can serve as a lock to prevent the turning of the bolt 3 without the possibility of the cotter pin bending under stress.

The ordinary type of turnbuckle in common use has had little or no means provided for preventing the turning of the bolts in the body, and as they are commonly used with twisted strands there is a tendency for the turnbuckle to loosen, and in some cases heavy damages have resulted from the loosening up of the strands through the turning of the bolt in the turnbuckle.

While I have described my invention and illustrated it in two designs, I do not wish it understood that I limit myself to these constructions, as it is evident that the invention may be varied in many ways within the scope of the following claim.

Claim:

A turnbuckle comprising in combination a body having a side member extending longitudinally thereof, a bolt engaging with said body by screw connection, a collar associated with said bolt and having a wing extending therefrom to engage with the side member of said body, said collar having an aperture extending diametrically therethrough and said bolt having an aperture extending diametrically therethrough, and a pin passing through said apertures to lock said collar to said bolt.

BERTON M. MATHIAS.

Copies of this patent may be obtained for five cents each, by addressing the "Commissioner of Patents, Washington, D. C."